United States Patent
Heubel et al.

(10) Patent No.: US 9,501,147 B2
(45) Date of Patent: Nov. 22, 2016

(54) HAPTIC DEVICE INCORPORATING STRETCH CHARACTERISTICS

(71) Applicant: Immersion Corporation, San Jose, CA (US)

(72) Inventors: Robert W. Heubel, San Leandro, CA (US); Francis Jose, Union City, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/142,921

(22) Filed: Dec. 29, 2013

(65) Prior Publication Data

US 2015/0253848 A1    Sep. 10, 2015

(51) Int. Cl.
*G06F 3/01* (2006.01)
*G06F 3/041* (2006.01)
*G06F 3/045* (2006.01)

(52) U.S. Cl.
CPC ............... *G06F 3/016* (2013.01); *G06F 3/017* (2013.01); *G06F 3/041* (2013.01); *G06F 3/045* (2013.01); *G06F 2203/04101* (2013.01); *G06F 2203/04104* (2013.01); *G06F 2203/04106* (2013.01); *G06F 2203/04808* (2013.01)

(58) Field of Classification Search
CPC ................................ G06F 3/016; G06F 3/041
USPC .................... 178/18.01–19.07; 345/173–178
See application file for complete search history.

(56) References Cited

U.S. PATENT DOCUMENTS

| | | | | |
|---|---|---|---|---|
| 6,160,540 A | * | 12/2000 | Fishkin | A63F 13/00 345/156 |
| 2009/0250267 A1 | * | 10/2009 | Heubel | G06F 3/041 178/18.03 |
| 2010/0141407 A1 | * | 6/2010 | Heubel | G06F 1/163 340/407.1 |
| 2014/0320436 A1 | | 10/2014 | Modarres et al. | |

* cited by examiner

*Primary Examiner* — Michael Pervan
(74) *Attorney, Agent, or Firm* — Medler Ferro Woodhouse & Mills PLLC

(57) ABSTRACT

Systems using haptic effect output devices with stretch characteristics are provided. In some embodiments, the stretch haptic effect output devices provide stretch effects responsive to software control. In other embodiments, the stretch haptic effect output devices provide stretch effects responsive to user input as well. Moreover, in some embodiments, the stretch haptic effect output devices provide stretch effects in conjunction and coordination with non-stretch haptic effect output devices as well.

28 Claims, 16 Drawing Sheets

HAPTIC DEVICE INCORPORATING STRETCH CHARACTERISTICS

FIELD OF THE INVENTION

An embodiment is directed generally to a user interface for a device, and in particular to producing a dynamic haptic effect using stretch characteristics.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate haptic effects, many devices utilize some type of actuator or haptic effect output device. Typically, these haptic effect output devices have provided a vibration or vibrotactile effect. However, it may be useful to provide additional effects using stretch devices or stretch materials as parts of devices.

Moreover, traditional architectures that provide haptic feedback with triggered effects are available. However, because user gestures and system animations have variable timing, the correlation to haptic feedback may be static and inconsistent, and therefore less compelling to the user. Providing for a system which interacts with user input may thus be useful in enhancing user experience.

Therefore, there is a need for an improved system of providing a haptic effect that includes stretch materials as haptic effect output devices. There is a further need for providing haptic feedback responsive to input data.

SUMMARY

The present invention is described and illustrated by way of example in the accompanying drawings and text. The text and drawings, including this summary, should be understood as illustrative rather than limiting.

An embodiment provides a method of producing a haptic effect. A processor receives a stretch input signal a stretchable sensor coupled to the processor. The processor determines whether a haptic effect output response should occur. The processor sends a signal to a first haptic effect output device coupled to the processor as an activation signal responsive to determining whether the haptic effect output response should occur. The first haptic effect output device coupled to the processor activates responsive to the signal from the processor. The first haptic effect output device may be a stretch output device or it may be a non-stretch haptic device. Additional haptic effect output devices may also be used.

BRIEF DESCRIPTION OF THE DRAWINGS

The present invention is illustrated by way of example in the accompanying drawings. The drawings should be understood as illustrative rather than limiting.

DETAILED DESCRIPTION

Figure 1:
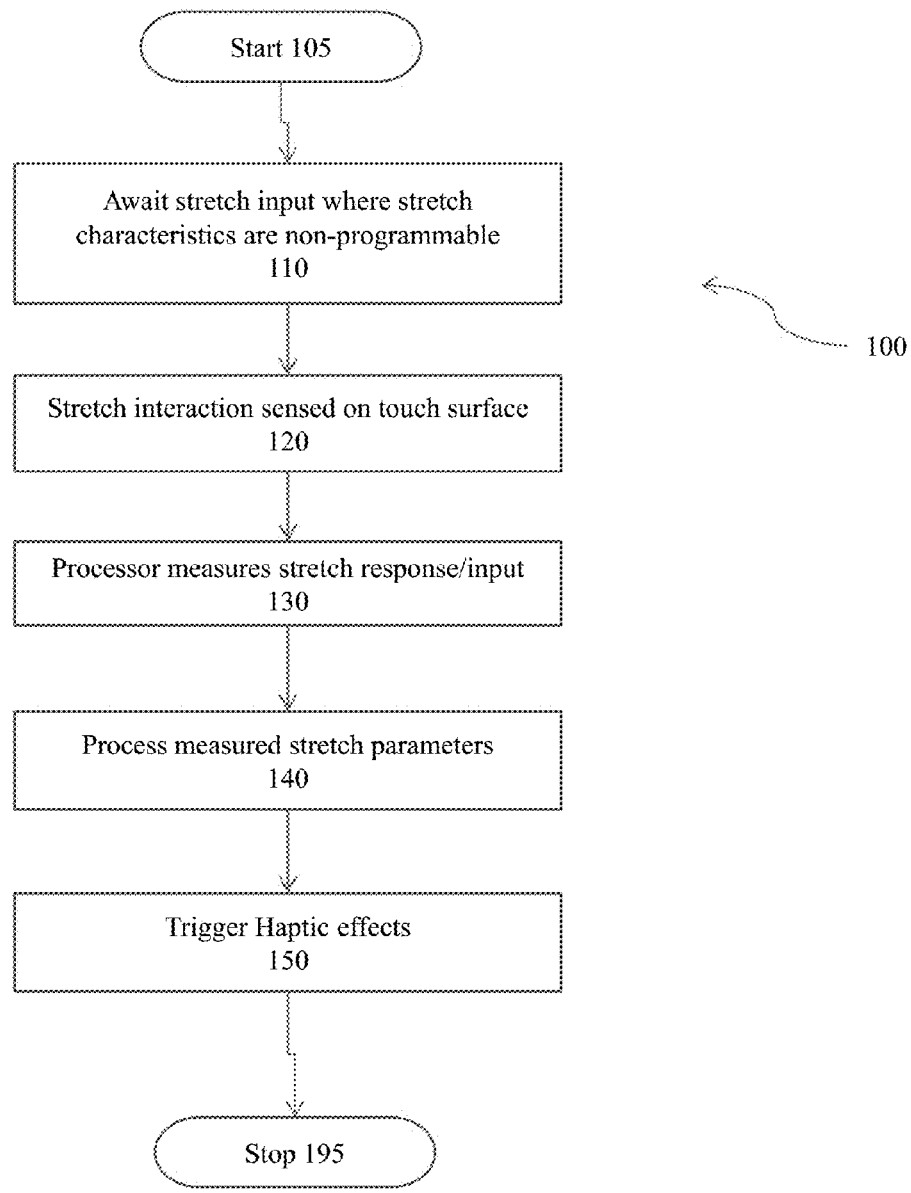
FIG. 1 illustrates an embodiment of a process of managing interaction between a stretch input sensor and a haptic effect output device.

A system, method and apparatus is provided for a haptic device incorporating stretch characteristics. The specific embodiments described in this document represent exemplary instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

A stretch haptic output device has the qualities of tension, compression, friction and texture that provide a natural and immediate tactile feedback sensation according to a speed or distance of the stretch action being performed. This in itself has the value of giving a user immediate or concurrent tactile feedback in control interactions tied to the speed or distance of the stretch being performed. For example, devices may provide a stretch haptic effect according to one or more speed or distance parameters such as on/off, volume up/down, rate-controlled scrolling, in-game character movements, for example, producing a powerful intuitive tactile haptic interaction. In another embodiment, non-stretch haptic output such as vibrotactile, kinesthetic or thermal feedback works with stretch haptic output to produce a combined haptic effect. Stretch haptic output effects generally result from a change in tension or compression of the stretch haptic output actuator or stretch haptic output device, and thereby provide a signal to the user. Such devices hereinafter are referred to as stretch output devices.

In one embodiment, a non-programmable stretchable surface layer is applied to a touch interactive surface like that on a handheld, mobile or non-mobile device, such as a mobile phone/tablet, wearable device, or other device, for example and UI control elements are activated using stretching interactions. A stretch haptic response may be the inherent stretch feeling of the surface material during the control interactions or may also have complimentary actuator responses to add confirmation of the stretch control actions/input or as additional haptic feedback.

It is important to note that the stretchable layer need not be applied to a display, but may be applied to any surface. For example, the stretchable area or layer may be associated with the back or sides of any device, including a mobile device or a non-mobile device, game controller, or wearable clothing, for example. Furthermore, the stretchable layer may be transparent, semi-transparent or fully opaque.

In an embodiment, a programmable stretchable surface layer is applied to a touch interactive surface on a handheld, mobile or non-mobile device, such as a mobile phone/tablet, wearable device, or other device, for example and UI control elements are activated using stretching interactions. The haptic response of this stretch system depends on the programmed response of the stretch surface. In this case, the physical properties of the stretch response can change, similarly to changes in physical states of piezoelectric or EAP elements when voltage is applied. For example, the coefficient of friction via the stretchable layer may change programmatically.

In yet another embodiment, a programmable stretchable surface layer is applied to a touch interactive surface on a handheld, mobile or non-mobile device, such as a mobile phone/tablet, wearable device, or other device, for example and UI control elements are activated using stretching interactions. The haptic response of this stretch system depends on the programmed response of the stretch surface and on non-stretch haptic devices coordinated with the stretch surface. The physical properties of the stretch response can change programmatically, for example. In this embodiment, complimentary actuators can also be used to give confirmation of stretch control actions/input or as additional haptic feedback.

Stretch output and stretch input may be incorporated into a wide variety of types of devices, both wearable and non-wearable. One may provide stretch input and output in a video game controller, keyboard, mobile device, a watch, eye fixtures such as Google Glass™, steering wheels, control panels and other devices or components, for example. Using such devices, stretch input and output may be tied to a display in a way which allows for interaction with a visual user interface or stretch input and output may be separate and distinct from a visual display, allowing for coordinated operation without making separate operation potentially confusing. One may also provide features which are not output immediately perceived by a user, such as smoothing a surface when a user attempts to slide a device or provided a rougher texture when a user places a device in a position for apparent storage. An example of such an application would be smoothing a surface when a user reaches into a pocket to remove a device, and providing a rougher exterior surface with greater friction when the user places the device into a pocket.

The stretch interactions may be single-point or multi-point. In the case of multi-point interactions, the stretch points may have different haptic feedback responses. A stretch response can be a result of a control surface interaction, such as touching the surface of a wearable, or as a result of sensor data or pre-programmed software. For example, if a user controls a scrolling list or a page turn on a display by gesturing up/down on a wearable, the user might receive a stretch in response to this control interaction. The touch surface need not have a display for all interaction scenarios.

In textile-based wearable interfaces, for example, a visual display need not be present to give the user stretch responses. Other interfaces need not have a visual display as well, whether on devices such as mobile or non-mobile devices, phones, tablets, large-format devices, or other technology incorporating stretch-based interfaces. In one embodiment, an actuation response area formed as a stretch output device is used with an optional input control interface. Additionally, if a user uses a secondary device, such as a mobile phone for this same scrolling control or page turn control, the user may still have a haptic stretch response in their wearable. This would require that the mobile device and wearable be in communication with each other. This capability is also a benefit when interacting with control surfaces that may not have a haptic response built into them as the wearable would supply the haptic response through a stretch sensation. Such a sensation may similarly result when using stretch interfaces in other technologies as noted above.

In the case without an input control interface, haptic stretch actuation may also be a response to sensor data or software. For example, a software alarm set for 8:00 am may actuate a wearable haptic stretch shirt to feel like someone is tugging at a shoulder for a wake-up call. Alternatively, the same wearable might work with GPS, camera data or other sensors to give guidance to the wearable user through stretch responses.

The presented concepts and embodiments, and the underlying array of deformable cells or other stretch actuators involved in a stretch output device can be enabled using one or a combination of such technologies as micro-fluidic displays, piezo and composite piezo technology, EAP, shape memory alloys, MEMS (pumps), smart gels, electro/magneto-rheological fluids, thermal fluid pockets, resonant devices, variable porosity membranes, laminar flow modulators, as well as electromagnetic actuators. Sensors used herein may include, but are not limited to: strain gauge sensors, FSR sensors (force-stress sensors), multi-touch touch sensors, multi-touch pressure sensors, temperature, humidity or atmospheric sensors, accelerometers, gyroscopes, magnetometers, microphones, and wireless transceivers.

Haptic substrates or stretch output devices, in one embodiment, are constructed by semi-flexible or semi-rigid materials. In one embodiment, stretch output devices, for example, includes one or more actuators, which can be constructed from fibers (or nanotubes) of electroactive polymers ("EAP"), piezoelectric elements, fiber of shape memory alloys ("SMAs") or the like. EAP, also known as biological muscles or artificial muscles, is capable of changing its shape in response to an application of voltage. The physical shape of an EAP may be deformed when it sustains large force. EAP may be constructed from Electrostrictive Polymers, Dielectric elastomers, Conducting Polyers, Ionic Polymer Metal Composites, Responsive Gels, Bucky gel actuators, or a combination of the above-mentioned EAP materials.

SMA (Shape Memory Alloy), also known as memory metal, is another type of material which can be used to construct stretch output devices. SMA may be made of copper-zinc-aluminum, copper-aluminum-nickel, nickel-titanium alloys, or a combination of copper-zinc-aluminum, copper-aluminum-nickel, and/or nickel-titanium alloys. A characteristic of SMA is that when its original shape is deformed, it regains its original shape in accordance with the ambient temperature and/or surrounding environment. It should be noted that the present embodiment may combine the EAP, piezoelectric elements, and/or SMA to achieve a specific haptic sensation.

A deforming mechanism in a stretch output device provides a pulling and/or pushing force to translate elements in the stretch output device, causing a flexible surface to deform. For example, when a deforming mechanism creates a vacuum between a flexible surface and an underlying substrate, the flexible surface is pushed against the underlying substrate causing the flexible surface to show the texture of the surface pattern of the underlying substrate. In other words, once a surface pattern of a substrate is generated, the flexible surface is pulled or pushed against the substrate to reveal the pattern of the substrate through the deformed surface of flexible surface. In one embodiment, a substrate and deforming mechanism are constructed in the same or substantially the same layer. A substrate may further include multiple tactile regions wherein each region can be independently activated to form a surface pattern of the substrate. A substrate is also potentially capable of generating a confirmation feedback to confirm an input selection entered by a user.

Non-stretch haptic effect output devices may include an electromagnetic actuator such as an Eccentric Rotating Mass ("ERM") in which an eccentric mass is moved by a motor, a Linear Resonant Actuator ("LRA") in which a mass attached to a spring is driven back and forth. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, as well as electromagnetic actuators, and so on. These haptic effect output devices may have a stretch or non-stretch effect, or may produce both types of effects in some implementations. One can enable stretch effects by, among other things, controlling longitudinal length (or other dimensions of a stretch actuator) or controlling inflation and deflation of a stretch actuator such as through use of a fluid or gas. Stretch effects can include, among other things, compression and tension, friction, textured and smooth surfaces, and raised or depressed surfaces. Textures may include accordion-style ridges, bumps of various shapes, concave bumps of various shapes providing depressions, or other features. Stretch effects can be implemented through both activation and relaxation of stretch output devices. Signals sent to stretch output devices may be stretch control signals, and signals received from stretch input devices may be stretch input signals.

As described above, in one embodiment, a non-programmable stretchable surface layer is applied to a touch interactive surface like that on a handheld, mobile or non-mobile device, such as a mobile phone/tablet, wearable device, or other device, for example and UI control elements are activated using stretching interactions. In one embodiment, the stretch haptic response is the inherent stretch feeling of the surface material during the control interactions. In another embodiment, a non-stretch complimentary actuator response provides added confirmation of the stretch control actions/input or as additional haptic feedback. The stretch response can be used alone or in conjunction with the non-stretch response, or the non-stretch response may be used alone. Examples of applications for this type of embodiment include rate controlled audio volume, cardinal direction, intensity, visual zoom, threshold, or page turning controls based on the amount, speed or direction of stretch. Other examples include binary switches. Stretch control action initiated by a user may be different from stretch control input received by a device. For example, input may be a finger stroke, with the stroke sensed by a stretch control input device. As another example, a control action may be bending a wrist, which may be sensed in a variety of ways using stretch control input devices, such as a stroke of a wrist against a surface or deformation of a surface through compression or tension generated by the bend of the wrist, for example.

FIG. 1 illustrates an embodiment of a process of managing interaction between a stretch input sensor and a haptic effect output device. Process 100 includes awaiting stretch input, sensing stretch input, measuring stretch input, using stretch input data to interact with software, and triggering haptic effects. Process 100 and other processes referred to in this document are described as a set of modules, which may be executed or implemented in a variety of ways, whether by a pre-programmed machine, a specialized machine, or a set of machines, and which may be re-arranged in order and in serial or parallel fashion within the context of the description.

Process 100 initiates at initiation module 105 and awaits stretch input at module 110. As indicated, this refers to use of a stretch-based sensor which is not programmable. Thus, one may receive data but the data is determined by the nature of the sensor. At module 110, the process prepares for input, such as by listening to a sensor or maintaining a polling or monitoring process related to the sensor, for example. At module 120, the process senses stretch interaction at the sensor or touch-sensing surface. This may indicate actual intentional input or some form of accidental input to be filtered out. The processor measures the stretch input or response of the sensor at module 130. This may involve, for example, translating raw data from a sensor into normalized data, for example. The processor then processes the measured stretch parameters of the sensor, interacting with internal software or controls, for example, at module 140. This may involve determining what appropriate predetermined response corresponds to the data received, for example. At module 150, the process triggers appropriate haptic output effects responsive to the software content or control interactions, and thereby responsive to the stretch input data. To provide a haptic output effect, the process applies a drive signal to a haptic output device, for example. The process then terminates at module 195, although it may continue in a looping manner.

The process may utilize a stretch output device or a non-stretch output device, or a combination of the two. Moreover, the process may use more than one of either type of device for output purposes. Stretch input and output devices may be deformable in a variety of ways as described above, allowing for various types of stretch input signals received from a user or surrounding environment and for various types of stretch output signals provided to a user or projected into the surrounding environment.

Figure 2:
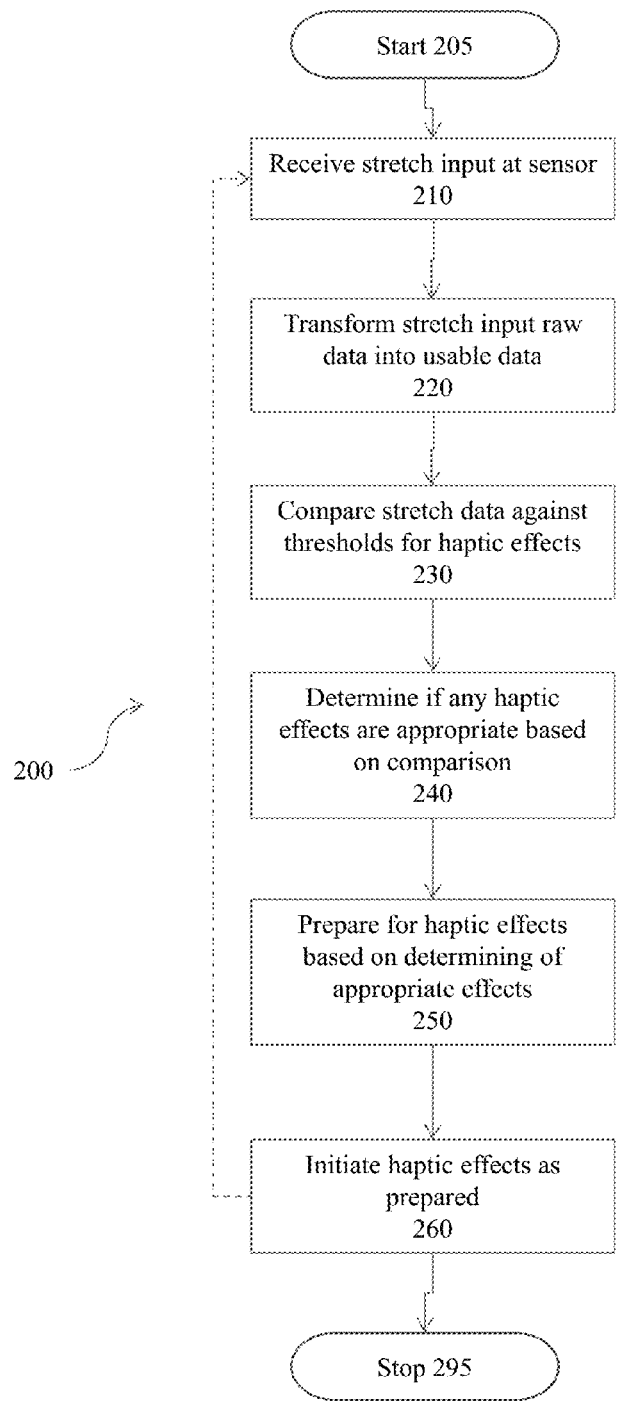
FIG. 2 illustrates an embodiment of a process of managing interaction between a stretch input sensor and a haptic effect output device.

As another example, FIG. 2 illustrates an embodiment of a process of managing interaction between a stretch input sensor and a haptic output device. Process 200 includes receiving stretch input at a sensor as data, transforming the stretch input data, comparing the stretch data against thresholds for effects, determining if any haptic effects are appropriate, preparing for haptic effects, and initiating haptic effects. Process 200 provides an alternative process to that process 100 of FIG. 1, while maintaining some similarities between the two processes.

Process 200 initiates at module 205 and proceeds with receipt of stretch input at a sensor at module 210. The stretch input arrives as raw data which the process then transforms into usable data at module 220. At module 230, the process compares usable data representing stretch data against thresholds for haptic effects. The process determines at module 240 whether any haptic effects are appropriate, based on the comparison of module 230. The process then prepares any appropriate haptic effects at module 250, such as by initializing or priming haptic effect output devices, for example. Then, at module 260, the process initiates haptic effects as prepared thus providing for a user experience.

Figure 3:
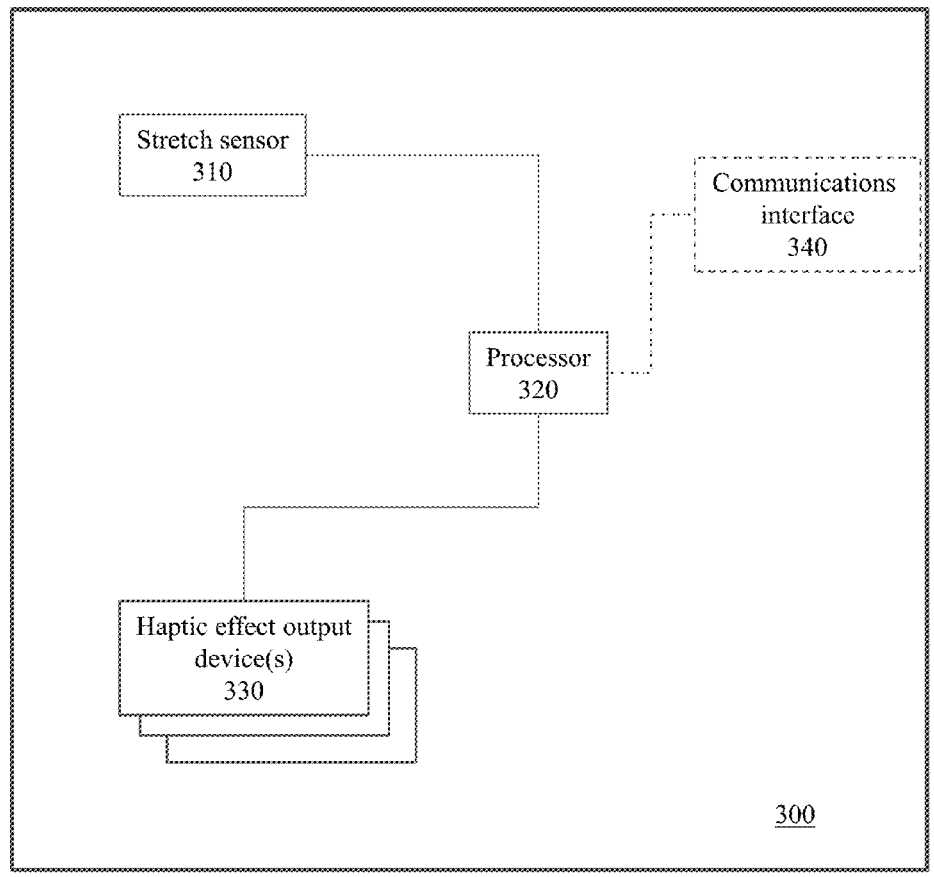
FIG. 3 illustrates an embodiment of an apparatus with a stretch sensor and haptic effect output devices.

One can implement the processes of FIGS. 1 and 2 on a variety of devices. FIG. 3 illustrates an embodiment of an apparatus with a stretch sensor and haptic effect output devices. Device 300 illustrates an example of the device, which may use a stretch sensor and have haptic effect output devices. Stretch sensor 310 is a sensor that senses input based on stretching or a stretch effect of a material. Processor 320 and processors in general discussed in this document, may be microprocessors, microcontrollers, or other devices or apparatuses capable of processing instructions and executing a method or process based on receipt of electrical inputs and dispatch of electrical outputs using a single core or multiple cores, for example. Processor 320 receives input from stretch sensor 310 potentially in a translated or converted form. Processor 320 is also linked to haptic effect output devices 330, which may provide for haptic effect outputs in various forms. Examples of haptic effect output devices may include an electromagnetic actuator such as an Eccentric Rotating Mass ("ERM") in which an eccentric mass is moved by a motor, a Linear Resonant Actuator ("LRA") in which a mass attached to a spring is driven back and forth. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, as well as electromagnetic actuators, and so on. These haptic effect output devices may have a stretch or non-stretch effect, or may produce both types of effects in some implementations. Also illustrated in device 300 is a communications port 340, which may be an optional or required part of device 300 in various embodiments.

Figure 4:
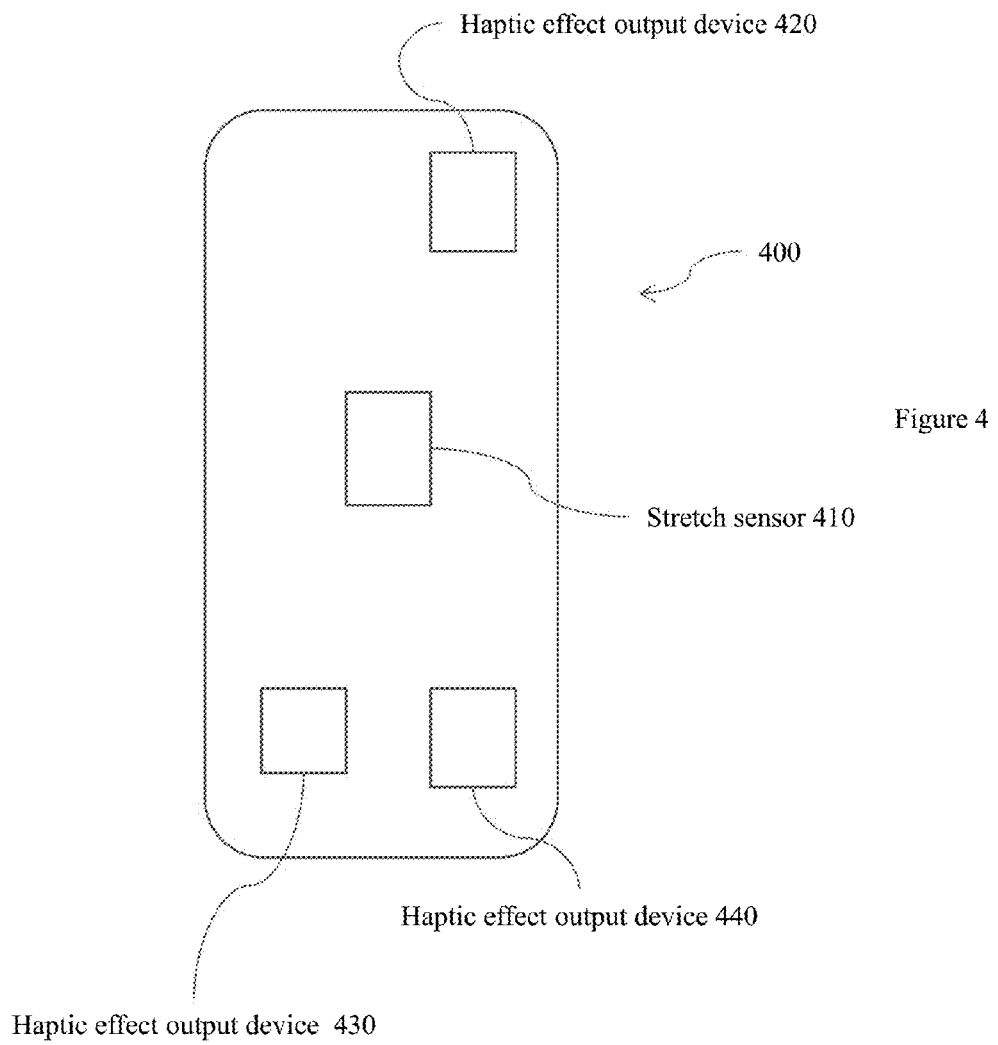
FIG. 4 illustrates an embodiment of an apparatus with a stretch sensor and haptic effect output devices.

Other examples of devices may also be used with the processes of FIGS. 1 and 2, for example. FIG. 4 illustrates another embodiment of an apparatus with a stretch sensor and haptic effect output devices. Device 400, as illustrated, includes a stretch sensor 410, and haptic effect output devices 420, 430 and 440. Not shown is an internal microprocessor or microcontroller, which may be present. Alternatively, in some embodiments, device 400 may have a communications port coupled to each of the illustrated components which allows for communication between components of device 400 and an external controller. Additionally, some embodiments may have both an internal microprocessor or microcontroller and a communications port, allowing for local control and communications with external devices. Haptic effect output devices 420, 430 and 440 may take various different forms such as those described with respect to output devices 330 of FIG. 3.

One can implement the processes of FIGS. 1 and 2 using the devices of FIGS. 3 and 4, for example. Thus, one can receive input at stretch sensor 410, have that input processed, and provide an output using one or more of haptic effect output devices 420, 430 and 440. Similarly, one can receive input at stretch sensor 310 have that input processed at processor 320, and provide an output using one or more of haptic effect output devices 330.

Programming a stretchable material may result in different and potentially better interaction with a user. In another embodiment described above, a programmable stretchable surface layer is applied to a touch interactive surface like that on a handheld, mobile or non-mobile device, such as a mobile phone/tablet, wearable device, or other device, for example and UI control elements are activated using stretching interactions. The haptic response of this stretch system would depend on the programmed response of the stretch surface. In this case, it is expected that the physical properties of the stretch response could be changed, similar to how piezoelectric or EAP elements change physical states when voltage is applied.

The added actuation feedback response may be applied as collocated actuator(s) or as an inherent response from the stretch material with actuation capability embedded in the stretch material. For example, something like an EAP response (EAP actuator) built into the stretch material may be used. With the added actuation feedback, the above non-actuation scenarios would still apply, but potentially with an added confirmation of user interaction or input by an actuator response.

In a gaming control example, stretching a directional control might move a virtual character or vehicle in a rate controlled manner in a specific direction and also allow the user to feel the virtual character or vehicle movement through related supplementary actuation. In the case of a wearable device or textile, such as clothing, the control may be coming from the wearable itself and have a haptic response. Alternatively, the control may be coming from a secondary device communicating with the wearable for a stretch response to the user.

The haptic response need not be tied to stretch input or UI control but may also be tied to content feedback. In a gaming example, content feedback may be in the form of a multi-player, or non-player character (NPC) interaction where a secondary user's action causes the primary user's device to have a haptic response, either through programmable haptic stretch material or supplemental actuation. Other content feedback examples need not be applied to stretch input or UI control, such as streaming audio or visual elements, visual-based or audio-based advertisements, exploring surface textures like topography maps, or virtual textiles, for example.

Figure 5:
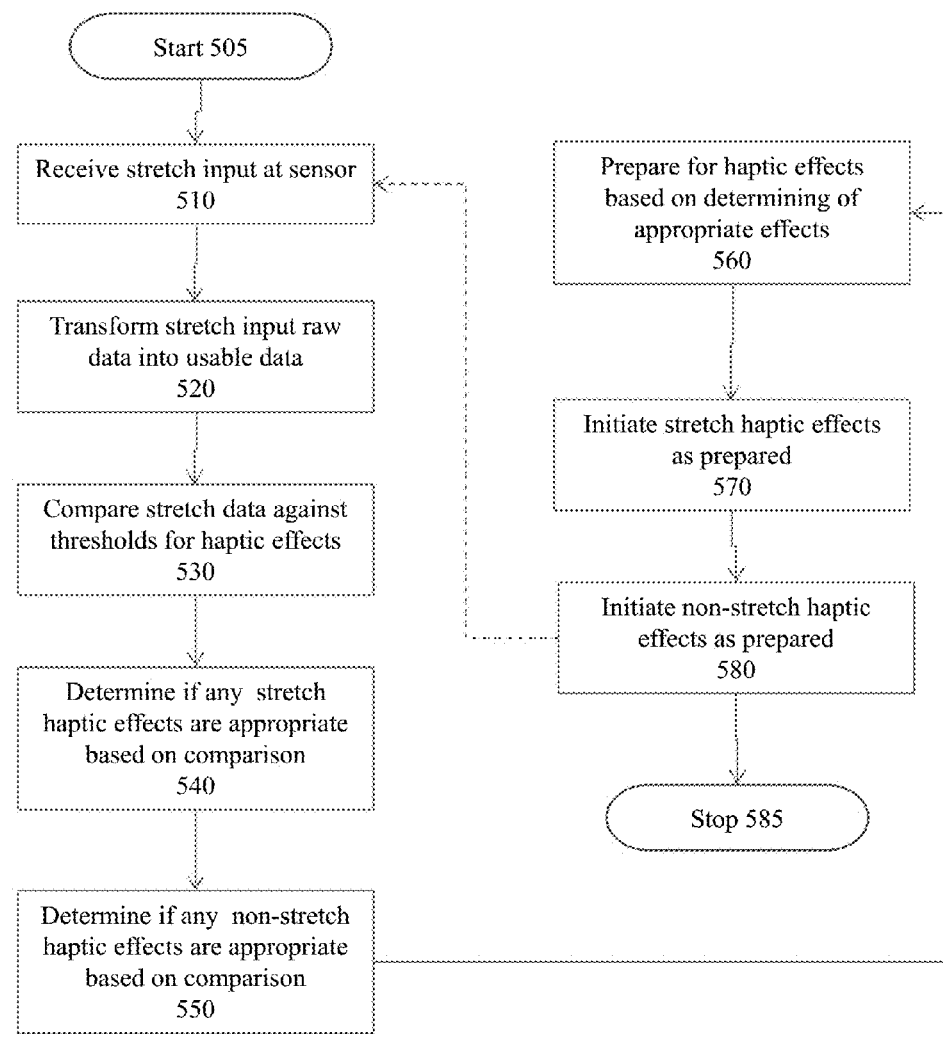
FIG. 5 illustrates an embodiment of a process of managing interaction between a stretch input sensor and stretch haptic effect output devices.

FIG. 5 illustrates an embodiment of a process of managing interaction between a stretch input sensor and stretch haptic effect output devices. Process 500 includes receiving stretch input at a sensor as data, transforming the stretch input data, comparing the stretch data against thresholds for effects, determining if any haptic effects (stretch and non-stretch) are appropriate, preparing for haptic effects, and initiating haptic effects (stretch and non-stretch).

Process 500 initiates at module 505 and receives stretch input at a sensor at module 510. The stretch input arrives as raw data. The process transforms the raw data into usable data at module 520. At module 530, the process compares usable data representing stretch data against thresholds for haptic effects. The process determines at module 540 as to whether any stretch haptic effects are appropriate, based on the comparison of module 530. Likewise, the process determines at module 550 as to whether any non-stretch haptic effects are appropriate based on the same comparison of module 530.

The process prepares any appropriate haptic effects at module 560, such as by initializing or priming haptic effect output devices, for example. Then, at module 570, the process initiates stretch haptic effects as prepared. Additionally, at module 580, the process initiates any non-stretch haptic effects as prepared, thus providing for a user experience based on both stretch and non-stretch haptic effects. The process completes at module 585, or it may continue in a looping manner.

Figure 6:
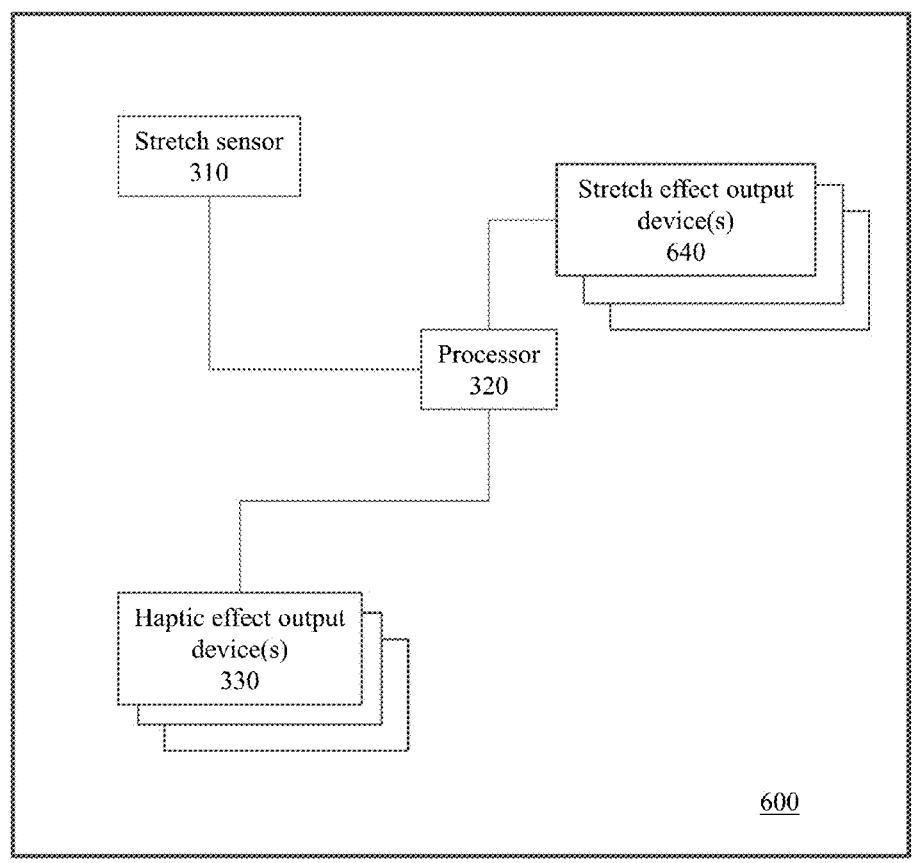
FIG. 6 illustrates an embodiment of an apparatus with a stretch sensor and stretch haptic effect devices.

Various devices may be used with a process such as that of FIG. 5. FIG. 6 illustrates an embodiment of an apparatus with a stretch sensor and stretch output devices. Device 600 uses a similar structure to device 300 of FIG. 3. However, in addition to haptic effect output devices 330, stretch haptic effect output devices 640 are also coupled to processor 320. Thus, one can provide both non-stretch and stretch haptic effects using the various haptic effect output devices. Thus, one can use device 600 to implement process 500 of FIG. 5, for example.

Figure 7:
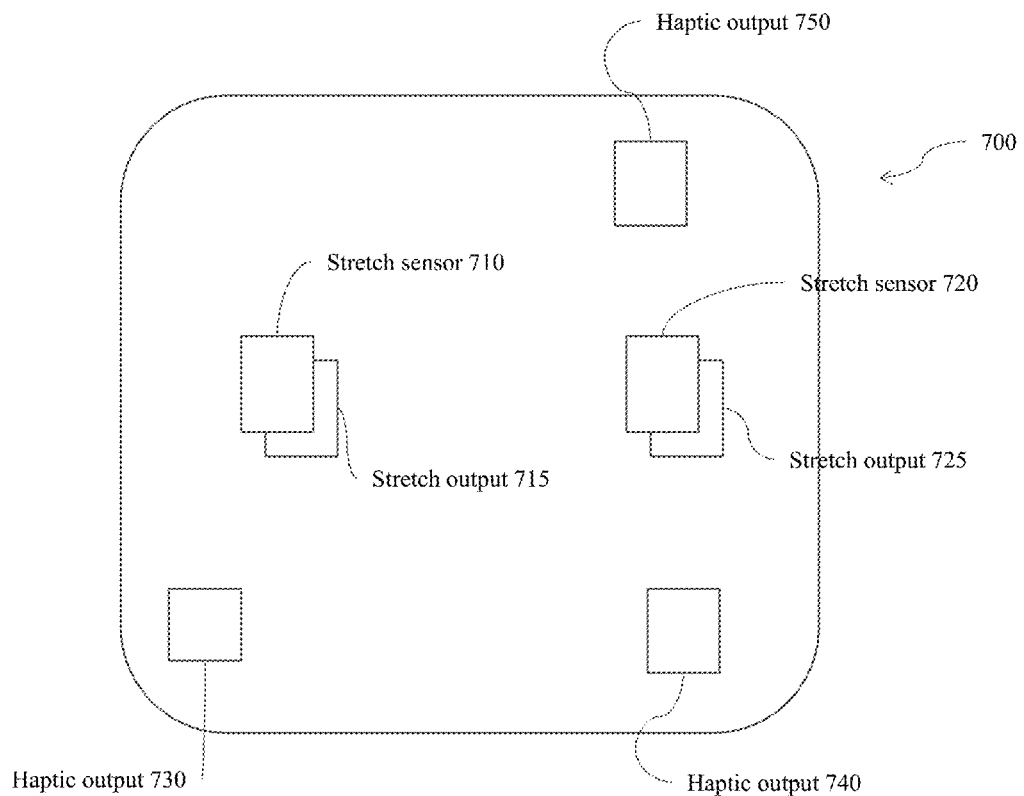
FIG. 7 illustrates an embodiment of an apparatus with a stretch sensor and stretch haptic effect devices.

FIG. 7 illustrates another embodiment of an apparatus with a stretch sensor and stretch output devices, such as may be used with the process of FIG. 5 or similar processes. Device 700 provides a device with stretch sensors stretch haptic effect output devices and non-stretch haptic effect output devices. Stretch sensors 710 and 720 allow for sensing of stretch input. Coextensive with stretch sensors 710 and 720 are stretch haptic effect output devices 715 and 725. Thus, device 700 can manipulate a texture or feel of stretch sensors 710 and 720 using stretch haptic effect output devices 715 and 725. As an example, device 715 to provide a smoother, rougher, firmer or more yielding surface for stretch sensor 710. Additional non-stretch haptic effect output devices 730, 740 and 750 are also provided with device 700. Devices 730, 740 and 750 provide for non-stretch haptic effects and may also be used in conjunction with devices 715 and 725. Device 700 may also include, for example, an internal processor and/or an internal communications port (not shown) as seen in FIG. 3, for example.

Figure 8:
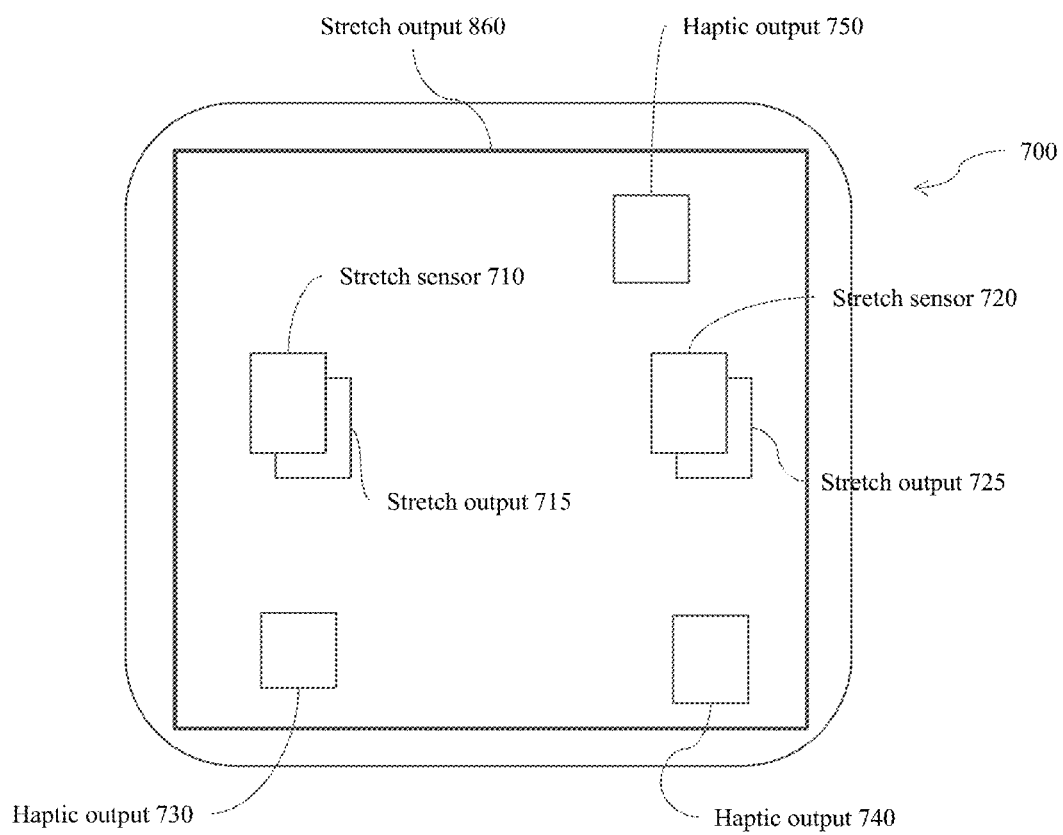
FIG. 8 illustrates an embodiment of an apparatus with a stretch sensor and stretch haptic effect devices.

Other variations of devices may also be used with the process of FIG. 5 or similar processes. FIG. 8 illustrates yet another embodiment of an apparatus with a stretch sensor and stretch haptic effect devices. Device 800 provides a device similar to device 700 of FIG. 7, incorporating an additional stretch haptic effect output device 860. Haptic effect output device 860 can provide different stretch characteristics from stretch haptic effect output devices 715 and 725, while also allowing for interaction with stretch haptic effect output devices 715 and 725.

Being able to programmatically change the physical parameters of a stretch surface response can effectively change the tension, friction, texture, tension and even temperature of the haptic touch surface. Furthermore, if a user is in contact with the stretch surface as it is changing its physical surface parameters, the user may experience kinesthetic feedback that moves or actively guides the user's touch interactions. This capability allows for many new haptic use cases based on programmatically changing the stretch surface feeling.

For example, in virtual environments, touch sensations can be added. Feeling game interactions, or live camera feeds where the user is guided toward or away from specific objects may now be an option. In one scenario one might feel a finger stretch towards the left giving the use a hint that the user needs to move the user's character in that direction (by moving the finger experiencing guidance. As another example, a surgeon performing non-invasive or remote surgery may be guided in a similar fashion toward a tumor or other target. An astronaut or airport ground crew may have their finger experience stretch sensations to help control the guidance of docking a spacecraft, airplane or other remote control actions. These stretch reactions may also take place on a virtual reality or augmented reality device, for example, a medical device or through a wearable textile as other examples.

Specifically, virtual textile sensations may be implemented. For example simulating the tactile properties of textiles like clothing or sample fabrics. These stretch reactions may make a wearable textile change tactile states to feel like different textile materials. This may provide a coat that can feel like smooth leather or soft suede or silk just by changing its stretch characteristics.

As another example, gaming control sensations can be enhanced. For example, one can provide stretch sensations that help keep a user's fingers in the correct game touch control locations. This has been a big problem with current touchscreen devices where a user's fingers easily slip off pre-defined non-tactile control "hotspot" locations known as virtual D-pad, top-hat or joystick controls. If one defined these virtual control hotspot areas as feeling more stretchable than the rest of the surface, the user would easily know when they were on the control surface or not. Likewise, one may provide raised borders through stretch actuators to help maintain contact within the control surface.

The above game control example is similar to how many physical laptop keyboards also include a rubberized pointer control generally between the "G" "H" and "B" keys. This rubberized control surface feels different from the rest of the keyboard input and has inherent stretch properties that are sensed and used by the controller to rate-control the speed and direction of the cursor movement. This type of functionality may be provided using stretch input and stretch output devices as part of a simulated keyboard.

Yet another example relates to providing GPS (global positioning system) guidance sensations. For example, one may select a destination with a GPS map and have the device guide the user to the location with stretch sensations. These stretch reactions might take place on a mobile device or through a wearable textile, for example, or through a connected device such as the steering wheel of a car. Topography or map sensations may also be provided in some instances. For example, simulating map elements of elevation, climate, rainfall, population, points of interest, or other features can be accomplished based on stretch characteristics. In one embodiment, low elevation on a map might have very little stretch feeling associated with it while higher elevations might feel more stretchable. In another embodiment, the map area defined as National Forest land might feel more stretchable than other areas of a map. This can also be implemented to apply to feeling building, facial or body maps, for example. This can also be applied to virtual data or to data for which an immediate real-world analog is not available, such as illustrating different quantities based on height or depth of a stretched surface, for example.

Furthermore, automotive control sensations on a steering wheel, touchscreen or touch surface elements for control, notifications and alerts can be provided. For example, the surface of a steering wheel tugging a user's skin slightly can alert the user to vehicles in a blind spot. Alternatively, in a control use case, one might turn audio volume up/down based on stretching a control surface on the steering wheel. Notification sensations can also be implemented in a non-automotive context, such as a stretch surface tugging on a user like a small child asking for help.

A further example involves producing media sensations that allow a user to feel video or photo stretch or texture elements. For example, a video clip of a first person perspective of a high-speed chase may have a user's finger stretched in response to the on-screen action. One might feel the user's finger stretched (guided) to the left or right as the car swerves left or right or feel the finger stretched up or down based on the acceleration/deceleration of the vehicle. These stretch reactions might take place on a mobile device or through a wearable textile, as examples of the devices in which this can be implemented.

Training or guidance sensations that kinesthetically guide a user's onscreen actions may be implemented as well. For example, a phone's user guide may help guide new users through phone options and setting screens in a more tactile and less visual manner. This can also provide better "muscle memory" training here, as the user associates physical sensations and actions with desired commands or results. Over time, location training using stretch guidance can thus more quickly establish long-term muscle memory.

Text stretch or texture sensations can also give text additional meaning For example, eReader or email/SMS messages that have different tension, friction, texture or even heat based on the content of the text can assist in interpretation of incoming data. As another example, contextual signals may be used, such as moving a finger over the word heartbeat and having a stretch touch reaction that actively moves a user's finger up/down in time to a virtual heartbeat. This information and stretch reactions might take place on a mobile device or through a wearable textile, for example, or on other devices such as a tablet, for example.

Multi-user interaction sensations can also be enhanced, where a user can feel and respond to stretching sensations of other users on shared, local or remote surfaces. For example, a game where two people are holding two different ends of an elastic cord with a rolling ball in the center, allowing users to virtually work together to stretch that cord to catapult or otherwise guide that ball to a common goal. As another example, a first user may feel a stretch effect as a result of movement of a virtual object by a second user on a shared virtual display, whether in a game, office or other shared environment.

In many of these examples above, use of stretch sensors and stretch output devices is involved. In yet another embodiment, a programmable stretchable surface layer is applied to a touch interactive surface like that on a handheld, mobile or non-mobile device, such as a mobile phone/tablet, wearable device, or other device, for example and UI control elements are activated using stretching interactions. The haptic response of this stretch system would depend on the programmed response of the stretch surface and on non-stretch haptic devices coordinated with the stretch surface. The physical properties of the stretch response may change, similar to how piezoelectric or EAP elements change physical states when voltage is applied. In this embodiment, complimentary actuators can also be used to give confirmation of stretch control actions/input or as additional haptic feedback. Thus, a more enhanced environment can be created.

Figure 9:
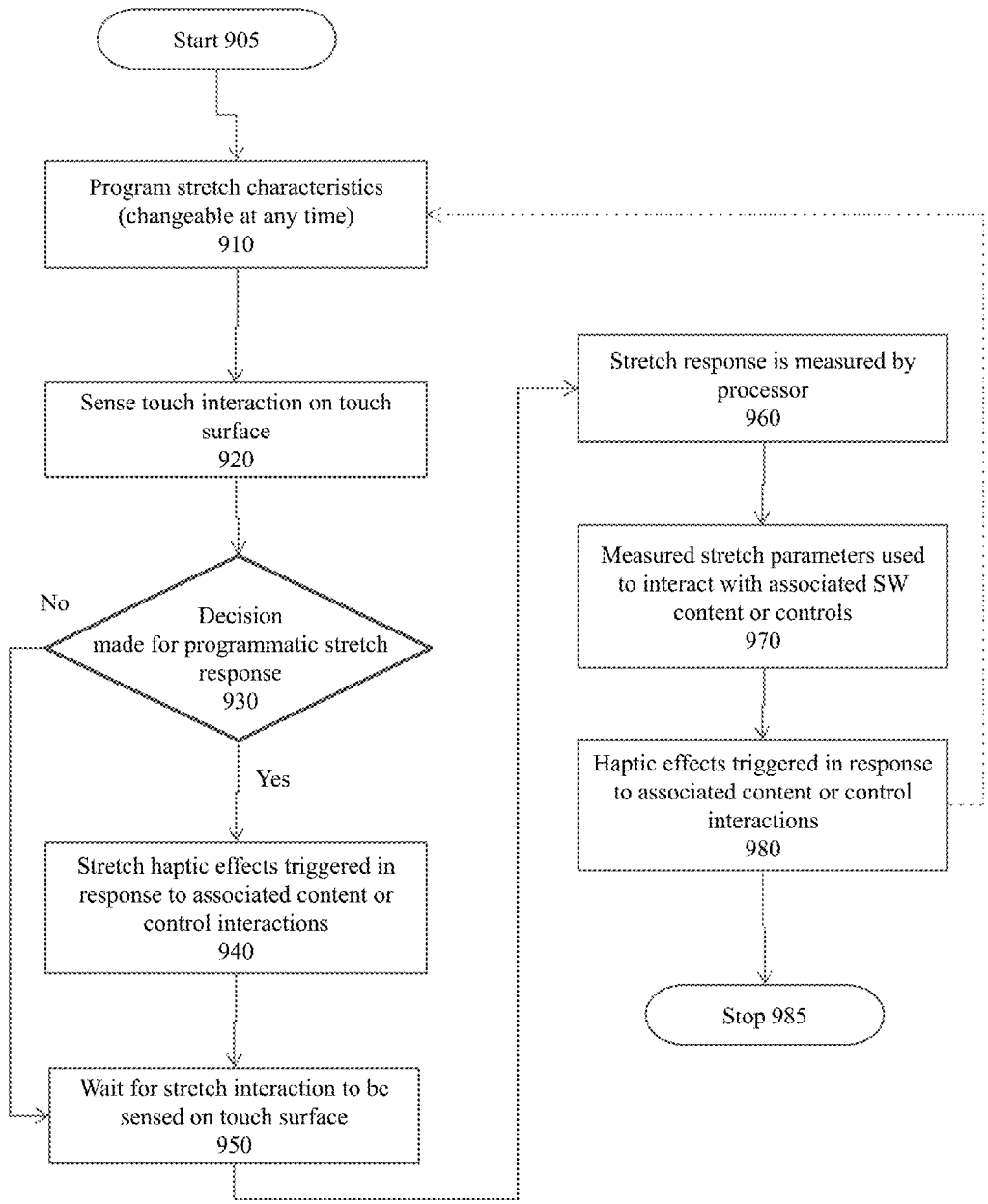
FIG. 9 illustrates an embodiment of a process of managing interaction between an input sensor and stretch and non-stretch haptic effect output devices.

One may manage such an enhanced environment with a process useful in relation to both stretch and non-stretch haptic effect output devices. FIG. 9 illustrates an embodiment of a process of managing interaction between an input sensor and stretch and non-stretch haptic effect output devices. Process 900 includes programming stretch characteristics of stretch haptic effect output devices, receiving touch input at a sensor as data, determining whether to provide a stretch response, triggering a stretch haptic effect output, waiting for stretch interaction sensor data, measuring stretch response, interacting with software based on stretch response data and triggering a haptic effect output.

Process 900 initiates at module 905 and programs stretch characteristics of a stretch output device at module 910. Touch input then arrives through a touch sensor (and associated data) at module 920. At module 930, the process determines whether any stretch haptic effects are appropriate, based on the data of module 920. If yes, then the process triggers stretch haptic effects through stretch output devices at module 940. In either case of the determination of module 930, the process then proceeds to module 950.

At module 950, the process awaits stretch interaction (or touch interaction) to be sensed on a touch surface (e.g. a touch sensitive senor). The process (for example, a processor executing the process) measures stretch response at module 960 by reading sensor data of touch senor(s). The processor then determines any appropriate haptic effects are at module 970, such as by interacting with software content or controls, for example, or comparing data with predetermined thresholds. Then, at module 980, the process initiates or triggers stretch haptic effects. Additionally, at module 980, the process triggers or initiates any non-stretch haptic effects as prepared as well, thus providing for a user experience based on both stretch and non-stretch haptic effects. The process may terminate at module 985, or may continue in a looping manner.

Figure 10:
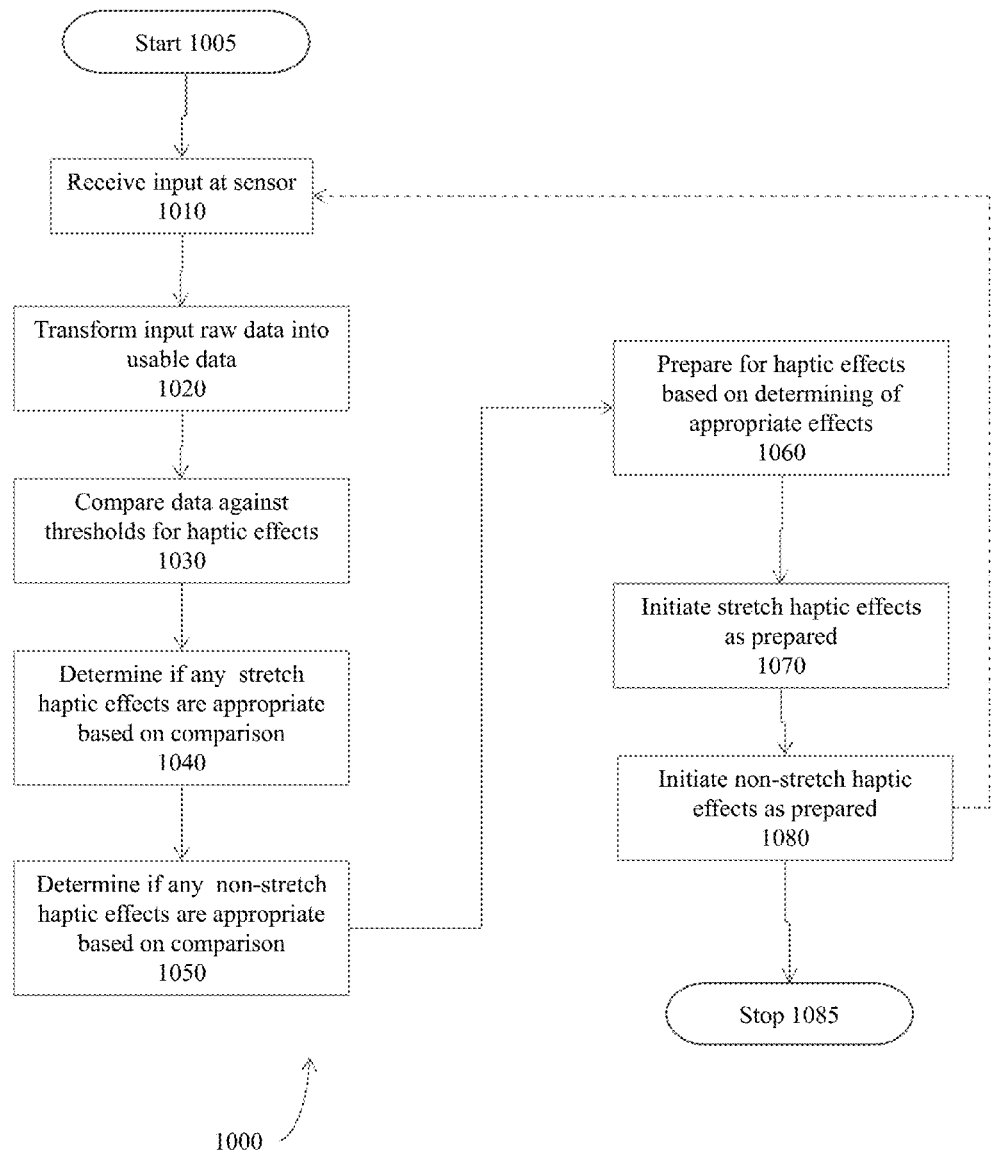
FIG. 10 illustrates an embodiment of a process of managing interaction between an input sensor and stretch and non-stretch haptic effect output devices.

Other processes may also be used to similar effect. FIG. 10 illustrates an alternate embodiment of a process of managing interaction between an input sensor and stretch and non-stretch haptic effect output devices. Process 1000 includes receiving input at a sensor as data, transforming the input data, comparing the data against thresholds for effects, determining if any haptic effects (stretch and non-stretch) are appropriate, preparing for haptic effects, and initiating haptic effects (stretch and non-stretch).

Process 1000 initiates at module 1005 and receives input of a sensor at module 1010. The sensor in question may be a stretch sensor or a non-stretch sensor. The input data arrives as raw data and the processor transforms the raw data into usable data at module 1020. At module 1030, the process compares usable data representing sensor data against thresholds for haptic effects. The process determines at module 1040 whether any stretch haptic effects are appropriate, based on the comparison of module 1030. Likewise, the process determines at module 1050 whether any non-stretch haptic effects are appropriate based on the same comparison of module 1030. Note that the process 1000 may be implemented based only on stretch output effects in some embodiments, thus allowing for interaction between a non-stretch input data stream and a stretch output device.

The process prepares appropriate haptic effects prepared at module 1060, such as by initializing or priming haptic effect output devices, for example. Then, at module 1070, the process initiates stretch haptic effects as prepared. Additionally, at module 1080, the process initiates any non-stretch haptic effects as prepared, thus providing for a user experience based on both stretch and non-stretch haptic effects. In the situation where only stretch output devices function as part of the process, the process may not include modules 1050 and 1080, for example. The process may terminate at module 1085, or may continue in a looping manner.

Figure 11:
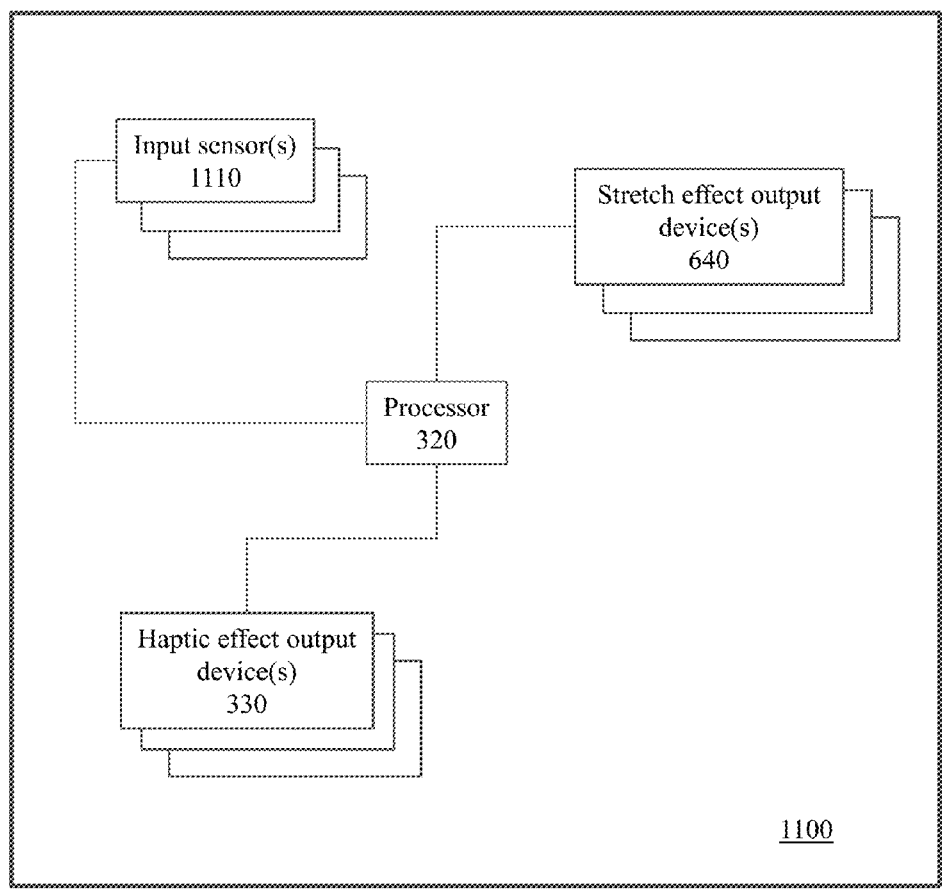
FIG. 11 illustrates an embodiment of an apparatus with an input sensor and stretch haptic affect output devices.

The processes of FIGS. 9 and 10 can be implemented with a variety of devices. FIG. 11 illustrates an embodiment of an apparatus with an input sensor and stretch haptic effect output devices. Device 1100 uses a similar structure to device 300 of FIG. 3 and device 600 of FIG. 6. Input sensor(s) 1110 are coupled to processor 320 in device 1100, providing for a variety of potential input sensors, potentially including both touch and non-touch input sensors, for example. Haptic effect output devices 330 and stretch haptic effect output devices 640 are also coupled to processor 320. Thus, while sensing a variety of types of input, one can provide both non-stretch and stretch haptic effects using the various haptic effect output devices. One can use device 1100 to implement process 1000 of FIG. 10 or process 900 of FIG. 9, for example.

Figure 12:
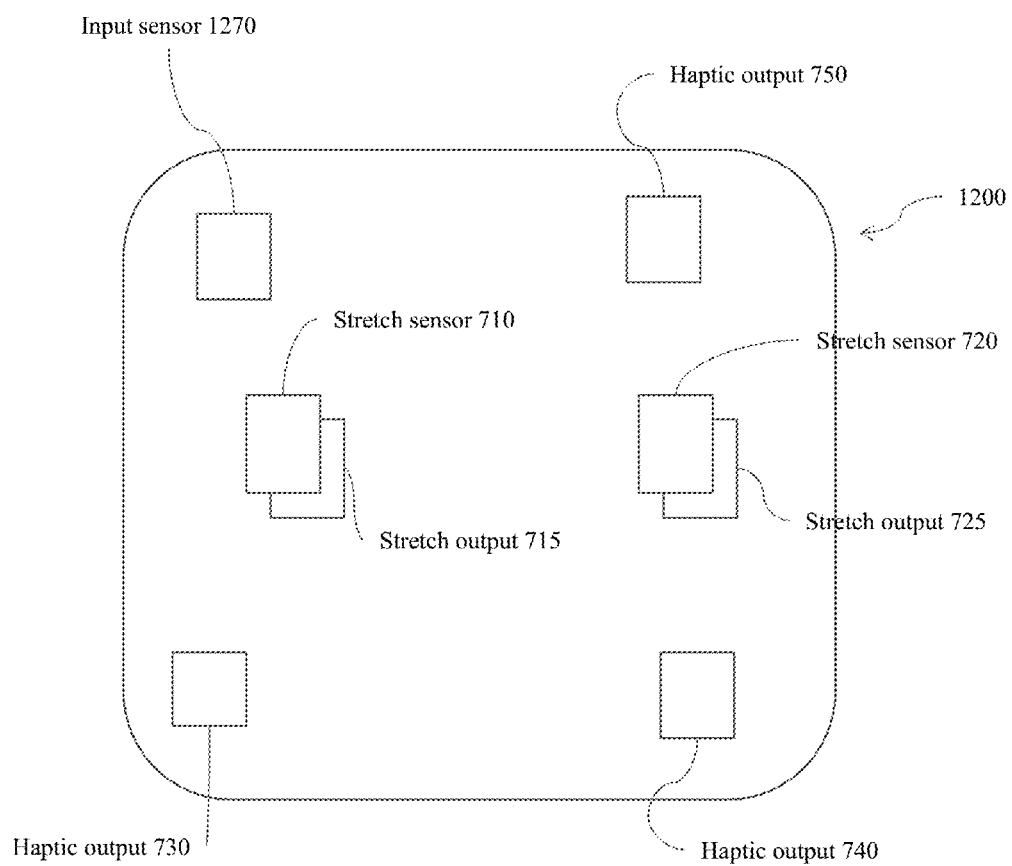
FIG. 12 illustrates an embodiment of an apparatus with an input sensor and stretch haptic effect output devices.

FIG. 12 illustrates an alternative embodiment of an apparatus with an input sensor and stretch haptic effect output devices. Device 1200 provides a device with stretch sensors, stretch haptic effect output devices and non-stretch haptic effect output devices. Stretch sensors 710 and 720 allow for sensing of stretch input. Coextensive with stretch sensors 710 and 720 are stretch haptic effect output devices 715 and 725. Thus, device 1200 can manipulate a texture or feel of stretch sensors 710 and 720 using stretch haptic effect output devices 715 and 725. As an example, device 715 can be used to provide a smoother, rougher, firmer or more yielding surface for stretch sensor 710. Input sensor 1270 is a non-stretch sensor which can be used for input as well. Input sensor 1270 may be of various types, such as a pushbutton, knob, slider, etc., for example, and may allow for various types of non-stretch input. Additional non-stretch haptic effect output devices 730, 740 and 750 are also provided with device 700. Devices 730, 740 and 750 provide for non-stretch haptic effects and may also be used in conjunction with devices 715 and 725. Device 1200 may also include, for example, an internal processor and/or a communications port.

Figure 13:
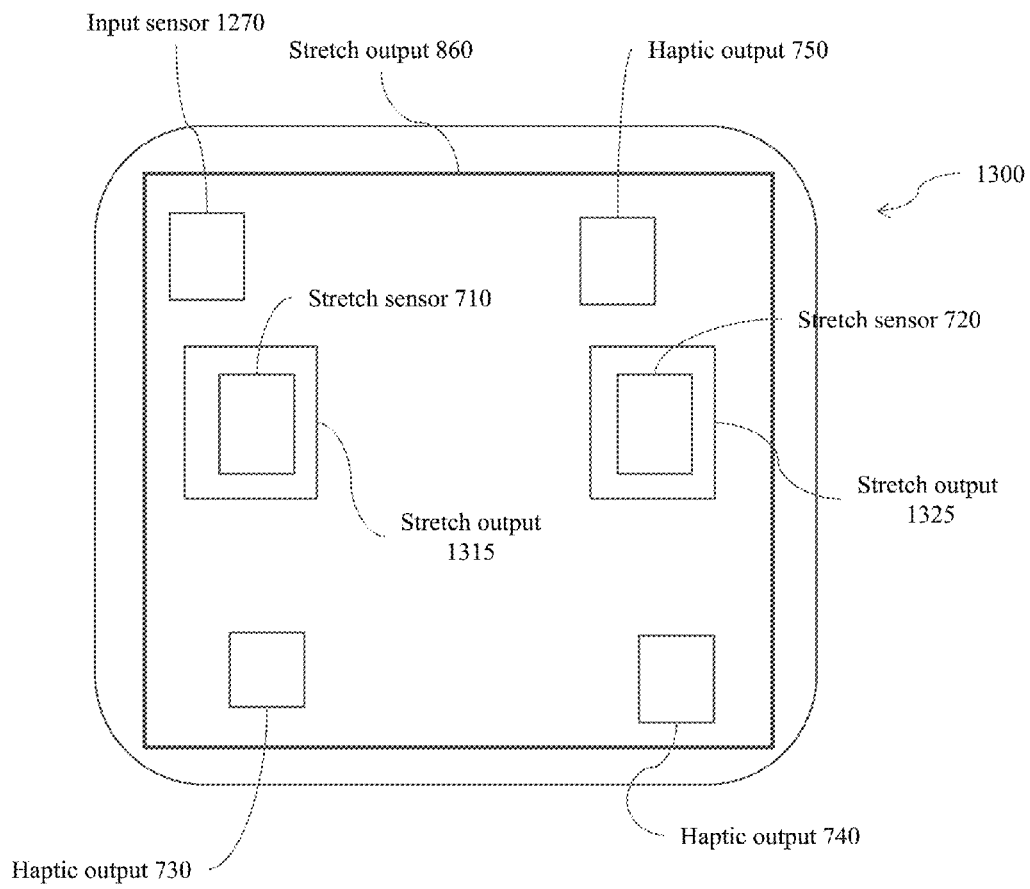
FIG. 13 illustrates an embodiment of an apparatus with an input sensor and stretch haptic effect output devices.

FIG. 13 illustrates yet another alternative embodiment of an apparatus with an input sensor and stretch haptic effect output devices. Device 1300 illustrates an example of a device with overlapping stretch haptic effect output devices, and illustrates some other variations on the devices of FIG. 8 and FIG. 12, for example. Device 1300 provides a device with stretch sensors (710, 720), non-stretch sensor(s) (1270), stretch haptic effect output devices (860, 1315 and 1325) and non-stretch haptic effect output devices (730, 740 and 750). In contrast to FIGS. 7 and 12, for example, stretch haptic effect output devices 1315 and 1325 are coextensive with sensors 710 and 720, but use a larger area to provide stretch haptic effect output. Thus, stretch haptic effect output devices 1315 and 1325 can be used to define the input area of sensors 710 and 720 through use of rigidity, firmness, or flexibility of the surface coinciding with each sensor, for example. Moreover, output device 860 can be used to provide a greater contrast between control surfaces defined by sensors 710 and 720 in conjunction with output device 1315 and 1325 and non-control surfaces on the rest of the device. Device 860 may be a stretch haptic effect output device which provides an output effect steering a user toward or away from desired or undesired areas. This may involve guiding a user by touch to control surfaces, for example.

Figure 14:
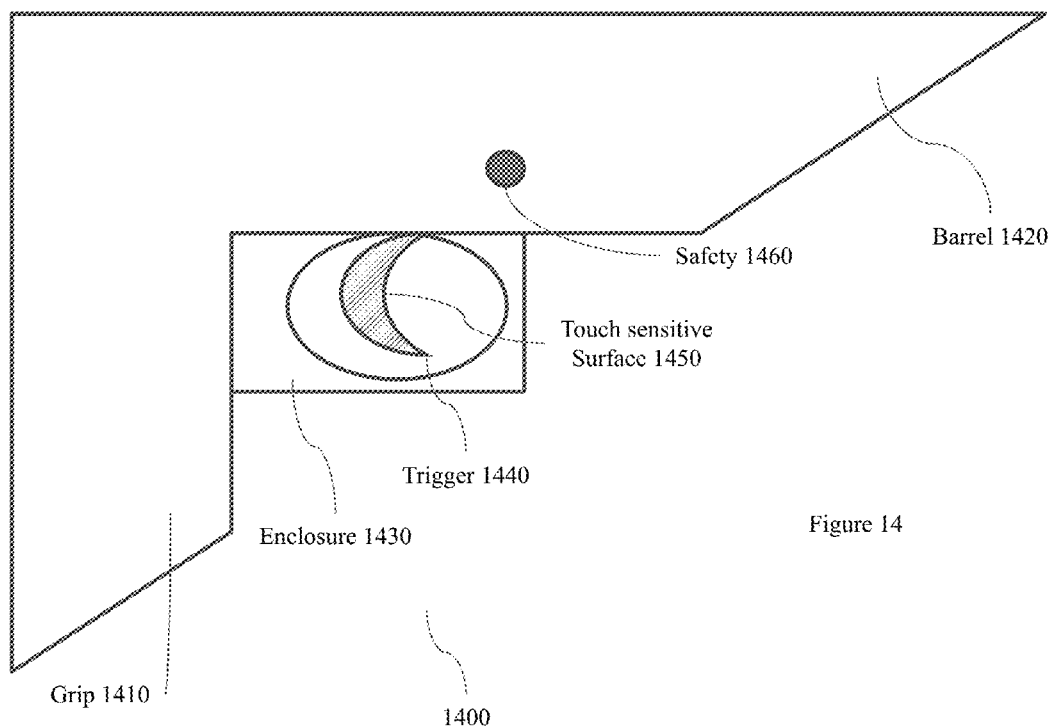
FIG. 14 illustrates an embodiment of an apparatus with an input sensor and stretch haptic effect output devices.

FIG. 14 illustrates still another alternative embodiment of an apparatus with an input sensor and stretch haptic effect output devices. Device 1400 provides for a controller stylized as a pistol, with a barrel, grip, trigger (and enclosure) and safety. Grip 1410 and barrel 1420 provide basic elements of the pistol. Trigger 1440 is surrounded by enclosure 1430 (e.g. a trigger guard), and includes a touch sensitive surface 1450. Surface 1450 may also embody a stretch haptic effect output device, too. Additionally, safety 1460 provides a safety button using a touch sensitive surface and potentially also using a stretch haptic effect output device as well. Thus, one can sense input at the trigger surface 1450 and the safety button surface 1460, for example. One can also potentially manipulate these surfaces. Thus, trigger surface 1450 can be hardened or softened to simulate different types of guns with associated variations in triggers. Similarly, safety button 1460 may be varied to simulate a depressed or raised button through use of stretch output devices, for example.

Figure 15:
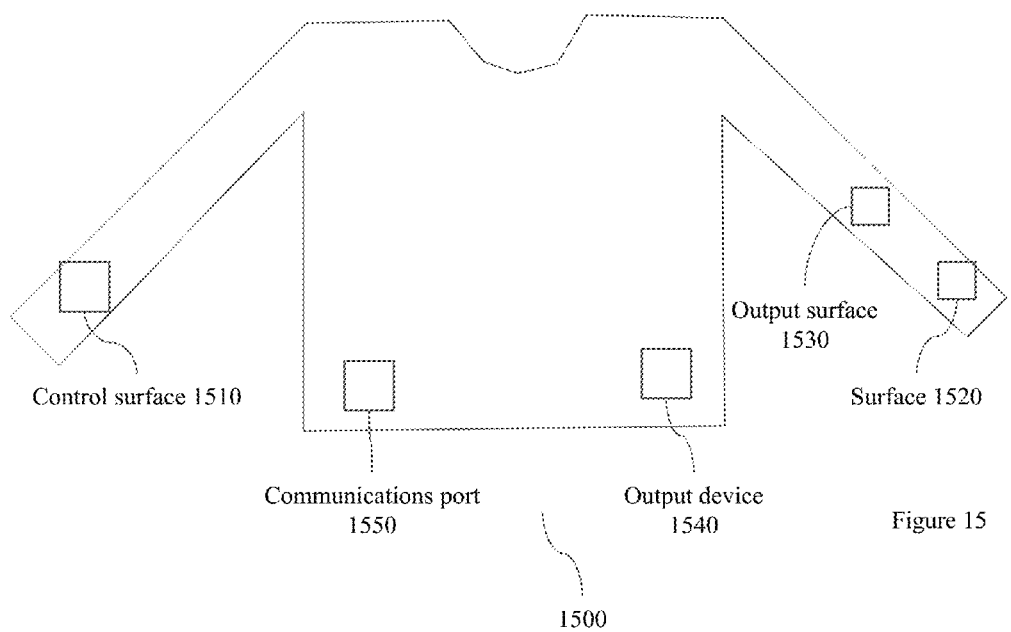
FIG. 15 illustrates an embodiment of an apparatus with an input sensor and stretch haptic effect output devices.

FIG. 15 illustrates another alternative embodiment of an apparatus with an input sensor and stretch haptic effect output devices. Device 1500 provides a garment with control surfaces and haptic effect output devices. Control surface 1510 is a stretch sensor, which may be measured by a processor integral to the garment or in communication with the garment, for example. Surface 1520 provides a stretch sensor and stretch haptic effect output device, which provides for input and for stretch output which modifies the sensation of the control surface for the user. Surface 1530 provides a stretch haptic effect output device which provides stretch output that a user may sense, for example. Device 1540 provides haptic effect output which may be a stretch or non-stretch haptic output. As with control surface 1510, each of surface 1520, surface 1530 and device 1540 may be controlled by a local processor or a processor external to garment 1500, for example. Garment 1500 may also be expected to include communications port 1550 to allow for communication with other devices. Communications port 1550 may be expected to connect to or couple with surfaces 1510, 1520 and 1530, along with device 1540, for example. Moreover, multiple control surfaces, surfaces (output), and output devices may be included, for example, along with other types of input devices (sensors), for example.

Figure 16:
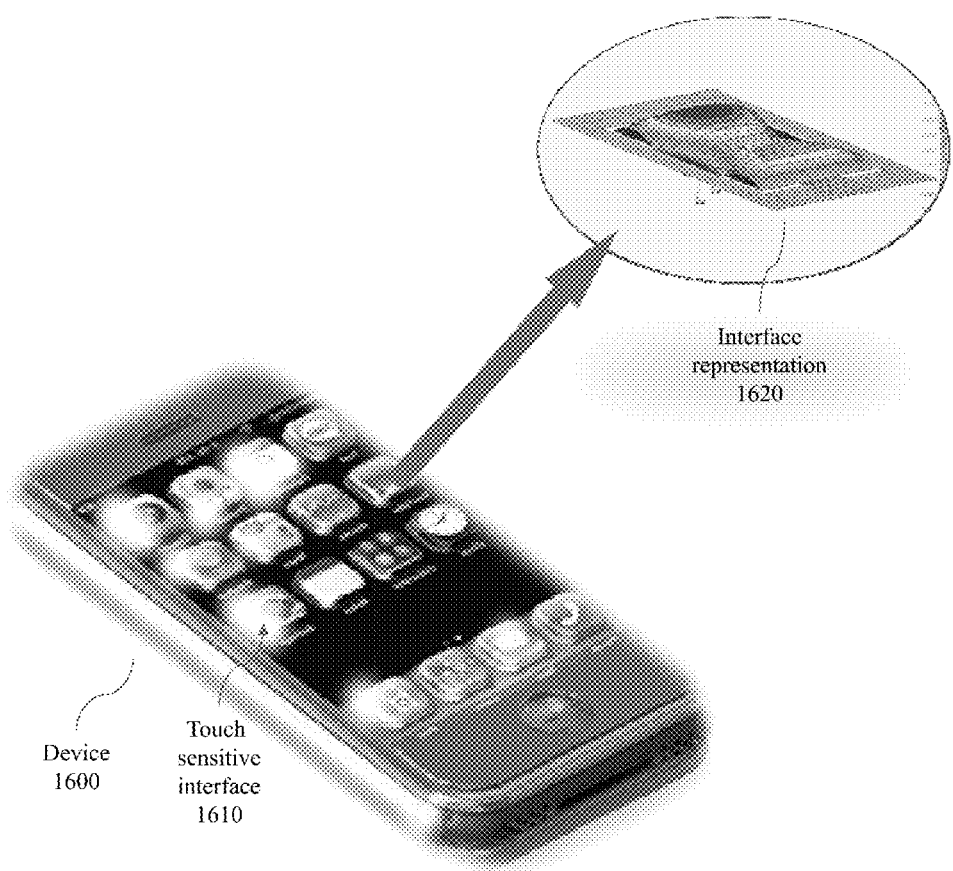
FIG. 16 illustrates an embodiment providing an example of implementation and actuation of a stretch haptic effect output device in an embodiment of an apparatus.

FIG. 16 illustrates an example of implementation and actuation of a stretch haptic effect output device in an embodiment of an apparatus. Apparatus 1600, which may be a mobile phone, for example, includes a touch-sensitive user interface, among other components. Touch-sensitive user-interface 1610 is shown as it may be perceived by a user, for example, with an underlying display and a top surface accessible by the user. Representation 1620 illustrates configuration of a stretch output device which forms part of the user interface 1610. The stretch output device is configured to simulate the feel of the illustrated icons of interface 1610, as portrayed in representation 1620. Moreover, a touch-sensitive layer or sensor overlays the stretch output device, allowing for sensing of touch-related data such as user input which results from user interaction with the display and touch output of the stretch haptic effect output device. Thus, a user may have a sense of what the displayed icons would feel like to the touch, and may interact with the device thereby.

The added actuation feedback response from an actuator may be applied as collocated actuator(s) or as an inherent response from the stretch material with actuation capability embedded in the stretch material; for example, an EAP response may be built into the stretch material. With the added actuation feedback, the above non-supplemental actuation scenarios would still apply but with an added confirmation of interaction or input by non-stretch actuator feedback. For example, in a game scenario one might be using stretch feedback to control the movement of a character but use additional actuation to feel in-game collisions, explosions or weapons fire.

In another example, for interaction confirmations, stretch feedback might control scrolling through a list but use additional actuation to feel a ticking sensation as one scrolls through the list elements or provide a bump sensation when reaching the ends of the list. In both the examples above the supplemental actuation feedback is being used to augment to user experience beyond what is possible with the stretch feedback alone. This specifically involves a programmable control surface and would also involve non-stretch haptic effect output devices. Mobile devices currently have the same basic slick surface feel that is inherently disconnected from the way one feels more mechanical or textural surfaces like gamepads, remotes, buttons, switches, clothing, etc.

A more tactile control surface that can change its feel based on content and use case allows for a richer user experience. This allows for better virtual control in general. A gamer using a mobile device connected to a large screen TV as a controller may look at the large screen but may not feel the controls on the touchscreen mobile device. A more tactile control surface as described in the previous scenarios would help in situations like this.

A variety of features can come out of use of programmable stretch haptic effect output devices. This can allow for using a stretchable surface for control, programmatically changing the surface parameters of the stretch experience (tension, friction and texture) and combining a stretchable control surface that also actuates. Using the programmable stretch surface to kinesthetically guide a user can then come into play. This can allow for using different stretch sensations to represent specific types of virtual information or to represent relative range of data or measurements. Using stretchable control responses with one or more supplemental actuators can further enhance the effect for the user.

In some embodiments, an array of deformable cells may be formed of a set of individually sensed and individually controlled/actuated haptic modules forming an overlay which can potentially be integrated into the touchscreen of mobile and tablet devices, for example. The array of deformable cells need not be associated with a display, such as in the case of wearable devices, for example. Each cell is potentially capable of producing haptic effects over a wide range of frequencies, from quasi-static deformation to high frequency vibration. The mechanical assembly configurations and arrangement of cells can allow for accumulating the force and displacement of adjacent cells, creating programmable smooth relieved (protrusion) or recessed (indentation) features, (e.g., free form deformation). In such an embodiment, the device uses an array of deformable cells to physically simulate tangible UI interactions, such as in mobility related applications. Such an array may be thought of as a single stretch haptic effect output device, for example.

In an embodiment, the array of deformable cells is utilized to physically simulate a tangible touchscreen keyboard, physically augmenting the text entry/keyboard interactions in touchscreen mobile devices. In other words, the array of deformable cells can be used to physically display each key or (more importantly) the edges between the keys of a keyboard in a text entry application. Other tangible features may also be simulated to augment the key display; for example, the F and J keys can be haptically marked, as they are in real keyboard, to facilitate typing, or upon holding the modifier keys (e.g., CTRL) certain keys with predefined functions can be haptically highlighted (CTRL+C, CTRL+B, CTRL+V, etc). The travel stroke and the force profile associated to each key can be tuned and adjusted to enhance fidelity and accuracy of the text entry/typing experience (compared to interaction with a real keyboard). Examples of user interface interaction scenarios which could be considered in this context include full keyboard display in a text entry application, and shaping keys to make a keyboard more ergonomic. One may also use this to create a physical button with geometry, travel, and force profile similar to that of a real button.

In another embodiment, the array of deformable cells can be used to enhance the interaction of the user with a list of items (e.g., list scrolling) by raising or recessing items in a scrolled or static list, thus facilitating selections and increasing realism. For example, each item in a static list can be raised so that the fingertip feels the transitions as it slides from one to the next. Moreover, marked items, such as "favorites" can have a different shape, and transitions between groups of items (e.g., categories, alphabetic groups) can also be highlighted with a distinct feature, such as a raised or recessed line. Similar deformations can be applied to a scrolled list, in which the shape would be felt by lightly touching the list and feeling items slide by.

The above highlighted or "favorite" items respond with a haptic response as a form of both content and UI feedback. The favorite item is felt as an UI element but the differentiated feeling of the favorite from the other items in the list or category or grouping provides a form of content feedback response giving additional information about the UI element.

Taken in another example, the above system and response may be applied to a virtual Braille keyboard for the blind where the user feels a series of raised or recessed items representing Braille character dots. As UI feedback, the stretchable raised or recessed provide a haptic response telling the user where the Braille character dots are located on the UI control surface. Additionally, the user can be given a haptic input confirmation response when using these raised or recessed stretchable items to input Braille text.

These same Braille character dot items can also act as a haptic output channel giving the user content information. For example, after inputting a Braille message these same haptic dot items could tactilely read back the message to the user through the stretch material or supplementary actuation. The same haptic output response could allow the visually impaired to feel any virtual text such as an incoming message or alert or any virtual content.

In addition, while the above example is specific to the visually impaired, it should be appreciated that the raised or recessed stretchable haptic items can be applied as a haptic input control method as well as content output system for many other embodiments.

In yet another embodiment, the array of deformable cells can be used to physically augment and thus facilitate manipulating objects in a virtual environment, as it allows the user to physically interact with the protrusion/recession "tied" to the object. Such capability renders the interaction more realistic since it provides a perception similar to real world object interaction scenarios. Moreover, the force profile associated with such interactions can be programmable, allowing for a richer HUI capable of displaying a wide range of data about the object and its properties. Examples of user interactions that could benefit from this embodiment are:

For example, moving or pushing a protrusion (or recession) overlaid on (and tied to) a certain UI element (widgets, app icons, files/folders, etc) across the screen can be simulated. Small UI widgets (such as resize handles) that are often visually occluded by the finger, once deformed, can be detected and manipulated through the touch kinesthetic feedback. In a similar example, the user can feel/explore the edges of a digital drawing, in a way that shapes can for example be filled (virtually painted) without spilling over, even when the finger occludes the edge, or the surface variations of a scanned original can be simulated.

As another example, display of interactions between a dragged object and other contents on the screen can be simulated. For example, a moving line could be felt through a raised icon as it is moved over a window's edge. In a similar example, while the user is dragging an object, it hits a barrier and cannot be moved any further. Text manipulation can also be simulated, such as through overlaying deformation features on top of a piece of text to facilitate text manipulation and address the visual occlusion problem in text interactions. Operations such as move, copy, and paste can be performed by physically interacting with the deformation feature overlaid on top of the text. Moreover, the same functionality can also taken advantage of when a virtual object moves on its own (e.g., under the effect of virtual gravity), and the user can feel it moving as illustrated or displayed.

In another embodiment, the array of deformable cells can be employed to simulate a physical controller in a touch-screen device. Deformation features can be raised from the flat surface to represent standard physical user interface controls such as a D-Pad or other control surfaces or arrangements. The array of deformable cells may not only simulate the physical shape of the D-pad, but also can replicate the experience of the user when interacting with a real controller. For example, if the left side of the D-pad is pressed down, the cells under the finger will move down while the cells on the right side will move up, rendering the interaction similar to that with a real D-pad controller. One may also provide a raised feature that the user can interact with similar to a 2D joystick, an interactive game console, or a track point found on laptop computers.

In still another embodiment, the array deformable cells can be used to simulate physical texture, as that found in real life at the macro scale, where small deformations can produce anything from sand to glass sensations.

In another embodiment, the array of deformable cells may be used to enable non-visual user interface interactions and gestures. Deformation is used to facilitate gestures performed without visual examination and to provide haptic feedback. This may allow a user to achieve enhanced interaction with both visual presentation on a screen (for example) and tactile presentation on a separate keyboard simulator, for example.

For example, one can provide finger guidance. One can create pathways on the screen guiding a user's finger towards a certain target location, and then blocking the finger when it reaches the target spot. More generally, a device could allow the user to "snap" to a certain grid or shape. As another example, one can arrange to send predefined messages based on predetermined shapes or patterns.

In yet other embodiments, the programmable deformation display described above can also be used to enable a wider range of novel gesture interactions, leading to a richer gesture language. For example, the user can enter spatial information by manipulating the display's surface as if it was made of clay or another similar material. In another example, the user can manipulate or alter the elevation in a map, brightness in an image (e.g., locally on an isolated portion of the image, or globally all over the image), distortions in an audio signal by manipulating parameters mapped to a 2D surface, or create a mark in the clay to mark content, such as a document.

Some embodiments can also be used to haptically augment free space gestures with deformation. In an embodiment, a mobile device can be moved using six degrees of freedom and deformation haptic effects can be played representing various information which changes based on orientation. For example, the user can swing the phone from left to right and at discrete angles a bump haptic effect can be played, or a deformation haptic texture can be displayed. A similar interaction may occur when the phone is held and rotated. In yet another embodiment, the interaction with objects bigger than the handheld device can be simulated using an array of deformable cells. The deformation on the device gives user the ability to explore or feel a virtual object through receiving haptic information about only parts of the object (depending on spatial location and grasping orientation, the information displayed might be different). Similar to the exploration of a sphere or larger object by hand, the deformation device could display the shape of the virtual object which would be felt by the hand at the specific locations as if the user was touching it. It might be feasible also to present other properties like softness/hardness and potentially temperature.

One skilled in the art will appreciate that although specific examples and embodiments of the system and methods have been described for purposes of illustration, various modifications can be made without deviating from present invention. For example, embodiments of the present invention may be applied to many different types of objects or devices operating individually or in conjunction with other devices. Moreover, features of one embodiment may be incorporated into other embodiments, even where those features are not described together in a single embodiment within the present document.

What is claimed is:

1. A method of producing a haptic effect, comprising:
receiving a stretch input signal at a processor through a stretch sensor coupled to the processor and to a touch interactive surface, wherein the stretch sensor's input area on the touch interactive surface is less than a total area of the touch interactive surface, and wherein the stretch sensor is configured to sense stretching of the touch interactive surface;
measuring at the processor at least one stretch parameter based on the stretch input signal, wherein the at least one stretch parameter is a distance, a speed, or a direction of the stretch;

determining at the processor whether a haptic effect output response should occur in response to the at least one stretch parameter;

sending a control signal from the processor to a haptic effect output device, which is coupled to the processor and is at least coextensive with the stretch sensor, in response to the determining of whether the haptic effect output response should occur; and activating the haptic effect output device coupled to the processor responsive to the control signal from the processor.

2. The method of claim 1, wherein:

the haptic effect output device is configured to generate a haptic effect that manipulates a texture of the at least coextensive stretch sensor, and the haptic effect output device is a stretch haptic effect output device coupled to the stretchable surface, the stretch haptic effect output device being configured to change a surface parameter of the stretchable surface and being selected from one of the group comprising a piezoelectric material, an electro-active polymer, a shape memory alloy, an electrostatic friction device, an ultrasonic surface friction device, or a combination of a haptic substrate and a deformable surface.

3. The method of claim 2, wherein:

activating the stretch haptic effect output device includes producing a haptic effect resulting in a rigid outline on an exterior surface of the stretch haptic effect output device.

4. The method of claim 2, wherein:

activating the stretch haptic effect output device includes producing a haptic effect resulting in a compressible surface on an exterior surface of the stretch haptic effect output device.

5. The method of claim 2, wherein:

activating the stretch haptic effect output device includes producing a haptic effect resulting in a predetermined pattern on an exterior surface of the stretch haptic effect output device.

6. The method of claim 1, wherein:

the stretch sensor is selected from one of the group comprising a piezoelectric material, an electro-active polymer, or a shape memory alloy.

7. The method of claim 1, further comprising:

sending a signal from the processor to an external component through a communications interface coupled to the processor;

receiving a signal at the processor from the external component through the communications interface coupled to the processor; and wherein determining at the processor whether the haptic effect output response should occur is based on the signal received at the processor from the external component.

8. The method of claim 1, further comprising:

sending a secondary control signal from the processor to a secondary haptic effect output device coupled to the processor in response to the determining whether the haptic effect output response should occur; and activating the secondary haptic effect output device coupled to the processor responsive to the signal from the processor, wherein the secondary haptic effect output device has different stretch characteristics than the haptic effect output device.

9. The method of claim 8, wherein:

the secondary haptic effect output device is selected from one of the group comprising an eccentric rotating mass, linear resonant actuator, a piezoelectric material, an electro-active polymer, a shape memory alloy, an electrostatic friction device, an ultrasonic surface friction device, an ultrasonic haptic transducer, a combination of a haptic substrate and a deformable surface, or an air jet.

10. The method of claim 1, wherein:

the processor, the stretch sensor and the haptic effect output device are all embedded in a wearable object.

11. The method of claim 1, wherein:

the processor, the stretch sensor and the haptic effect output device are all included in a controller.

12. A haptic effect enabled apparatus comprising:

a stretch haptic effect output device on a stretchable portion of a touch interactive surface and configured to change a surface parameter of the touch interactive surface;

a stretch sensor coupled to the stretch haptic effect output device and to the touch interactive surface, wherein the stretch sensor's input area on the touch interactive surface is less than a total area of the touch interactive surface, wherein the stretch sensor is configured to sense stretching of the interactive surface, wherein the stretch haptic effect output device is at least coextensive with the stretch sensor;

a processor coupled to the stretch haptic effect output device, the processor further coupled to the stretch sensor, wherein the processor is configured to determine whether a haptic effect output response should occur in response to a stretch input signal received from the stretch sensor and is further configured to send a control signal to the stretch haptic effect output device relating to the haptic effect output response; and a communications interface coupled to the processor.

13. The apparatus of claim 12, wherein:

the stretch haptic effect output device is configured to generate a haptic effect that manipulates a texture of the at least coextensive stretch sensor, and the stretch haptic effect output device is selected from one of the group comprising a piezoelectric material, an electro-active polymer, a shape memory alloy, an electrostatic friction device, an ultrasonic surface friction device, or a combination of a haptic substrate and a deformable surface.

14. The apparatus of claim 12, wherein:

the stretch sensor is selected from one of the group comprising a piezoelectric material, an electro-active polymer, or a shape memory alloy.

15. The apparatus of claim 12, further comprising:

a secondary haptic effect output device coupled to the processor and having different stretch characteristics than the stretch haptic effect output device.

16. The apparatus of claim 15, wherein:

the secondary haptic effect output device is selected from one of the group comprising an eccentric rotating mass, linear resonant actuator, a piezoelectric material, an electro-active polymer, a shape memory alloy, an electrostatic friction device, an ultrasonic surface friction device, an ultrasonic haptic transducer, a combination of a haptic substrate and a deformable surface, or an air jet.

17. The apparatus of claim 12, wherein:

the processor, the stretch sensor and the stretch haptic effect output device are all embedded in a wearable object.

18. The method of claim 12, wherein:
the processor, the stretch sensor and the stretch haptic effect output device are all included in a controller.

19. The apparatus of claim 12, further comprising:
an external component coupled to the processor through the communications interface.

20. The apparatus of claim 12, wherein the processor is further configured to send a signal to the stretch haptic effect output device to programmatically change the surface parameter of the stretchable surface.

21. The apparatus of claim 20, wherein the surface parameter is selected from one of the group comprising a tension, a friction, or a texture of the stretchable surface.

22. The haptic effect enabled apparatus of claim 12, further comprising another haptic effect output device configured to generate a haptic effect that provides contrast between a control surface defined by the stretch sensor and a non-control surface on another part of the apparatus.

23. The haptic effect enabled apparatus of claim 12, wherein the input area of the stretch sensor is defined by the stretch haptic effect output device.

24. The haptic effect enabled apparatus of claim 23, wherein the stretch haptic effect output device that defines the input area of the stretch sensor is coextensive with the stretch sensor.

25. The haptic effect enabled apparatus of claim 23, wherein the stretch haptic effect output device that defines the input area of the stretch sensor has a larger area than the stretch sensor.

26. A haptic effect enabled apparatus comprising:
a first haptic effect output device, the first haptic effect output device on a stretchable portion of a touch interactive surface and providing output by changing a surface parameter of the touch interactive surface;
a stretch sensor on the touch interactive surface, wherein the stretch sensor's input area is less than a total area of the touch interactive surface, wherein the first haptic effect output device is at least coextensive with the stretch sensor, wherein the stretch sensor is configured to sense stretching of the stretchable material;
a processor coupled to the first haptic effect output device, the processor further coupled to the stretch sensor;
a communications interface coupled to the processor; and
a second haptic effect output device coupled to the processor.

27. The apparatus of claim 26, wherein:
the first haptic effect output device is configured to generate a haptic effect that manipulates a texture of the at least coextensive stretch sensor, and
the first haptic effect output device is selected from one of the group comprising a piezoelectric material, an electro-active polymer, a shape memory alloy, an electrostatic friction device, an ultrasonic surface friction device, or a combination of a haptic substrate and a deformable surface.

28. The apparatus of claim 26, wherein:
the second haptic effect output device is selected from one of the group comprising an eccentric rotating mass, linear resonant actuator, a piezoelectric material, an electro-active polymer, a shape memory alloy, an electrostatic friction device, an ultrasonic surface friction device, an ultrasonic haptic transducer, a combination of a haptic substrate and a deformable surface, or an air jet.

* * * * *

UNITED STATES PATENT AND TRADEMARK OFFICE
CERTIFICATE OF CORRECTION

PATENT NO.        : 9,501,147 B2
APPLICATION NO.   : 14/142921
DATED             : November 22, 2016
INVENTOR(S)       : Robert W. Heubel and Francis Jose It is certified that error appears in the above-identified patent and that said Letters Patent is hereby corrected as shown below:

In the Claims

Column 22, Line 8 Claim 26:
"the stretchable material" should be replaced with --the stretchable portion--.

Signed and Sealed this
Twenty-ninth Day of May, 2018

Andrei Iancu
*Director of the United States Patent and Trademark Office*